March 17, 1970 W. C. BELK 3,500,982
FRUIT COUNTING MACHINE
Filed June 17, 1968 3 Sheets-Sheet 3
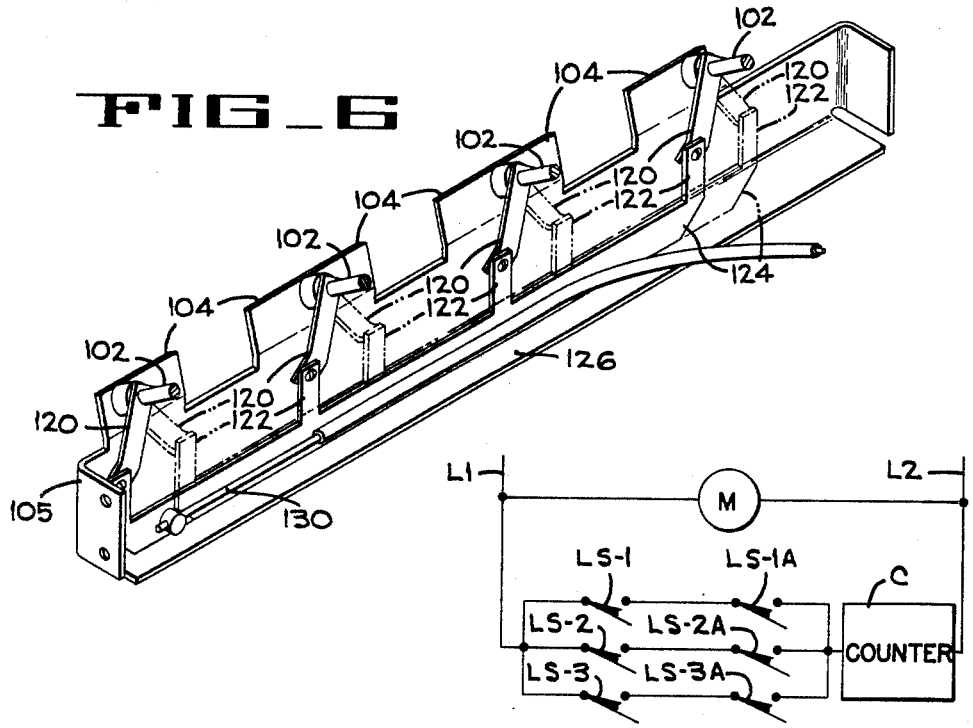
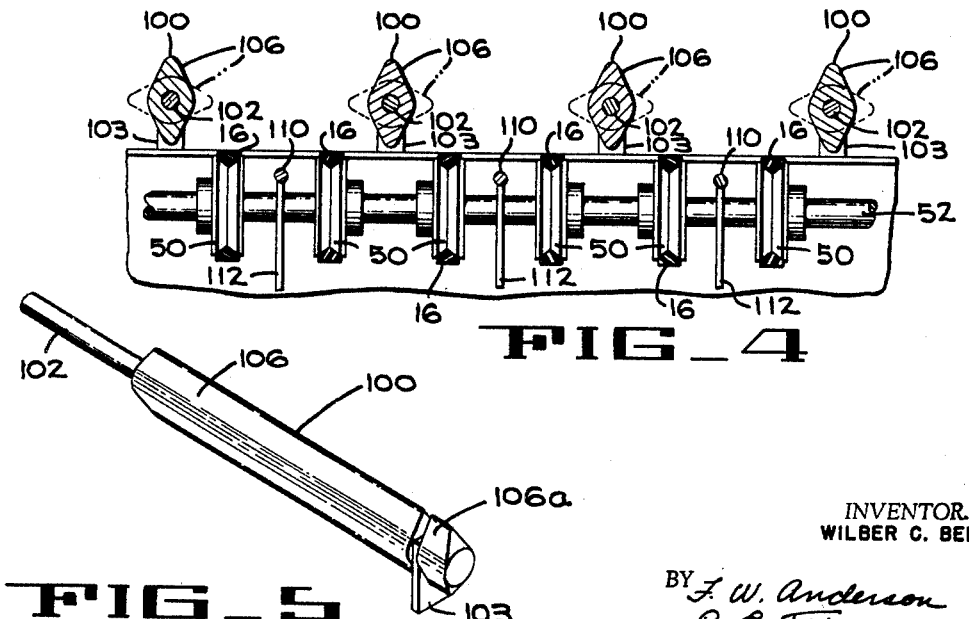
INVENTOR.
WILBER C. BELK
BY F. W. Anderson
C. C. Tripp
ATTORNEYS United States Patent Office 3,500,982
Patented Mar. 17, 1970

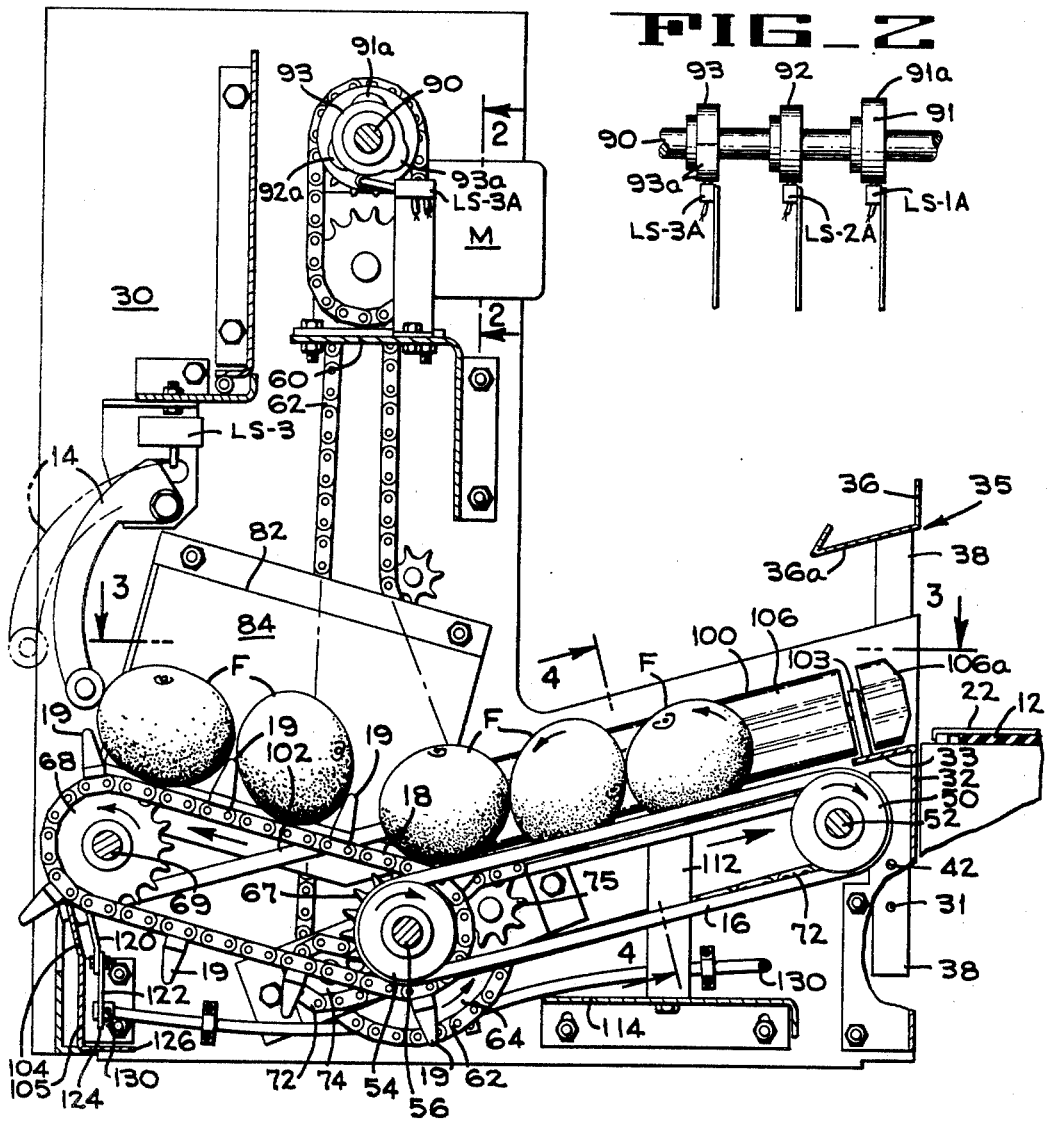

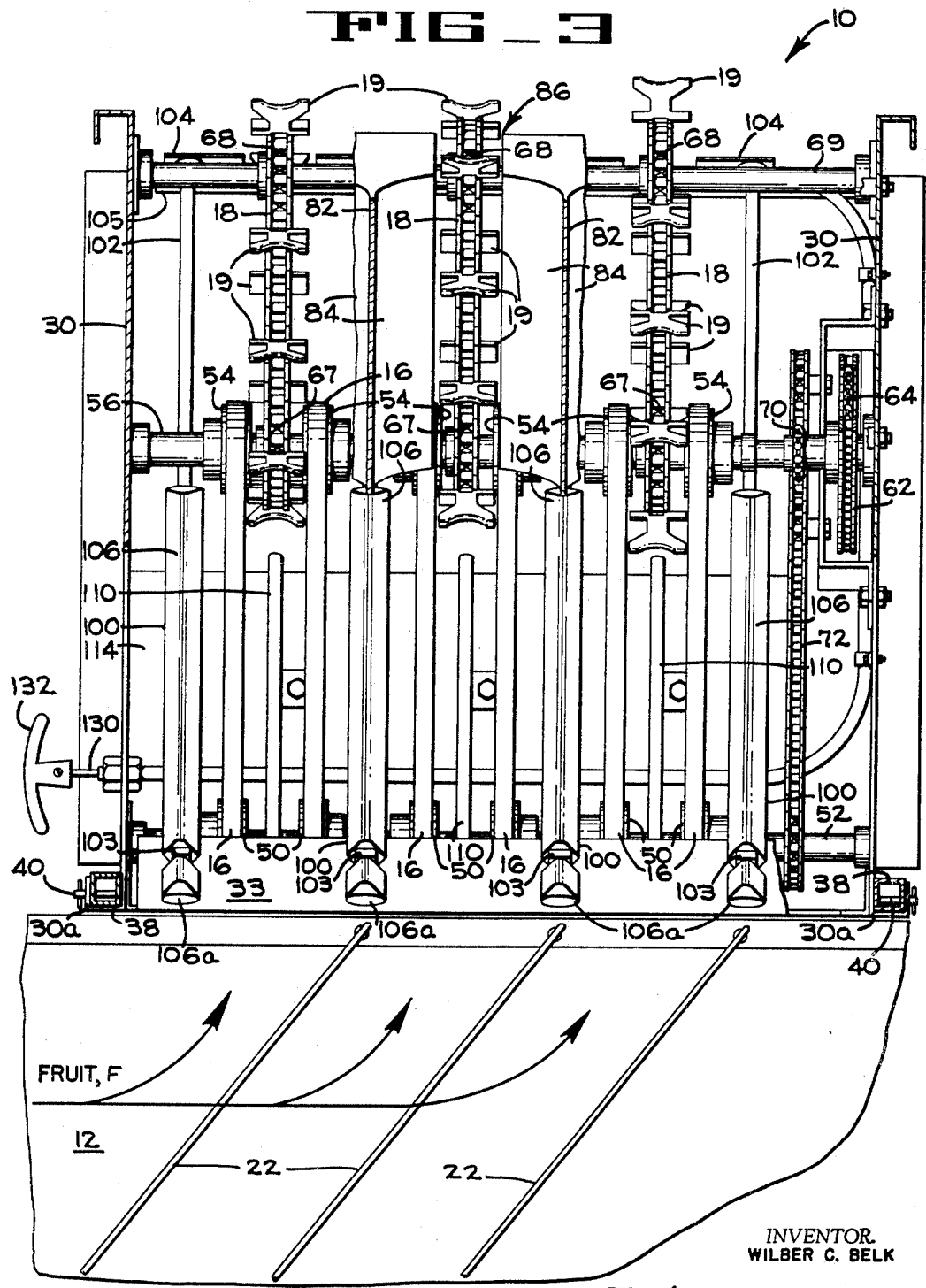

3,500,982
FRUIT COUNTING MACHINE
Wilber C. Belk, Lakeland, Fla., assignor to FMC Corporation, San Jose, Calif., a corporation of Delaware
Filed June 17, 1968, Ser. No. 737,712
Int. Cl. B65g 47/26
U.S. Cl. 198—30                                    6 Claims

ABSTRACT OF THE DISCLOSURE

Fruit is diverted from a conveyor into the counting machine and into single-file arrangement in three parallel lanes each of which is provided with a fruit switch actuating arm arranged to be tripped by a fruit as it is discharged from the lane. The fruit in the lanes is discharged therefrom at staggered time intervals and a timing cam is provided to successively briefly close a circuit to a counter through each of the fruit switches at similar staggered time intervals and thereby obtain a count for each fruit that is discharged from the machine. Adjustable lane separators are provided which can be rotated to change the lane size so that the machine can handle both large and small fruit at different times without missing a count or permitting the machine to be jammed.

BACKGROUND OF THE INVENTION

Field of the invention

In general, this invention pertains to that field of art concerned with apparatus for counting fruit, and more particularly, it pertains to fruit counting machines which operate by feeding fruit past switch actuating arms in single file arrangements within a plurality of parallel lanes.

Description of the prior art

Citrus fruits, such as oranges and grapefruit, are commonly packaged in bags or other containers by count after having gone through a preliminary sizing or grading operation. Consequently, the need has long existed for a machine which is able to handle a bulk supply of fruit from a grading or sizing conveyor and count each individual fruit before discharging it into a bag or box for shipment to the marketplace. Some example of machines of this nature which have been used by the citrus fruit industry are disclosed in U.S. Patents 3,045,910 and 3,297,248 to McLearn.

In McLearn Patent 3,045,910, a supply chute or hopper extends downwardly to distribute fruit upon a rotary drum structure having a plurality of pockets spaced circumferentially thereabout in a series of offset rows. A fruit counting switch is provided for each row with its actuating arm being positioned at the discharge side of the drum, and a timing device is driven in synchronism with the drum to briefly close a circuit to a counting mechanism through each of the switches as they are energized by a fruit about to be discharged. Although the basic fruit counting system of this structure functioned well, problems were encountered both in feeding fruit to the rotating drum and in preventing a fruit from being discharged from the drum prior to its being counted.

McLearn Patent 3,297,248 discloses a structure which represents an improvement over the aforedescribed machine. In the operation of the machine disclosed in this patent, fruit is first delivered to a plurality of downwardly extending feed conveyors providing a series of parallel, single file lanes; then transferred directly from the feed conveyors to a plurality of upwardly extending timing conveyors which uniformly space the fruit; and finally directed past a series of aligned actuating arms which precondition fruit switches that are successively energized by a timing mechanism and serve to count each fruit being discharged from the machine in a manner generally similar to that disclosed in the prior McLearn patent. While the improved structure solved the problem of the premature discharge of fruit from the timing conveyors, feeding of the fruit to these conveyors remained somewhat of a problem particularly when a machine was being used to handle fruit of widely differing sizes. For example, when the lanes for delivering the fruit downwardly to the timing conveyor are constructed to handle the largest sizes of grapefruit (of about five or six inches in diameter), they are obviously too wide to handle the very small oranges or tangerines which may be only two inches in diameter or less. With the smaller fruit, it can easily be appreciated that fruit can be passed in a side-by-side relationship in a single feeding lane and that the machine will therefore miss a fruit count. To counteract this tendency, one solution which has been practiced with the improved McLearn machine is the provision of a series of overlying dividers or filler strips which can be placed in the lanes so as to reduce their effective width and prevent the smaller sizes of fruit from straying from a single-file arrangement as they are fed to the counting conveyors. It will readily be appreciated, however, that these loose filler strips are subject to bending and misalignment when they are placed in the machine and removed therefrom during the various fruit processing runs. Furthermore, the time consumed in positioning these strips in the paper locations is excessive and reduces the overall efficiency of the apparatus.

SUMMARY OF THE INVENTION

The fruit counting apparatus of the present invention is broadly similar to that disclosed in the aforementioned McLearn Patent 3,297,248. A plurality of downwardly extending feeding lanes are provided to transport fruit from a horizontal conveyor to a plurality of upwardly extending timing conveyors which move the fruit into uniformly spaced positions and direct it past fruit switch actuating arms. In the case of the present invention, however, special lane dividers are provided between the downwardly extending fruit feeding lanes. These lane dividers can be rotated from a first position providing relatively wide fruit lanes to a second position wherein the fruit lanes are relatively narrow, and this rotation of the lane dividers can be accomplished quickly and easily by the operator of the fruit counting machine.

To further aid in the feeding of the fruit to the timing conveyors, the downwardly extending feed conveyors are provided with belts which are driven in the reverse direction to the flow of the fruit to help in keeping the fruit singulated in the lane. Also, an adjustable gate member is provided at the inlet end of the fruit feeding lanes so that only one layer of fruit can be fed into the lanes from the horizontal conveyor.

The special lane dividers and the associated gate and feed conveyors provide a means for making the fruit counting machinery of the present invention versatile and easily adaptable to different sizes and varieties of fruit without the necessity of time consuming manual operations. Furthermore, the proposed devices are both simple in construction (and therefore economical) and highly efficient in operation as will be made clear by the following description.

BRIEF DESCRIPTION OF THE DRAWINGS

FIGURE 1 is a longitudinal section through a fruit counting machine embodying the apparatus of the present invention.

FIGURE 2 is a partial side elevation taken along the line 2—2 and showing the positioning of the timing cams and their associated timing switches.

FIGURE 3 is a horizontal section taken along the line 3—3 of FIGURE 1, but showing the machine without the fruit therein and with portions of the machine being broken away for the purpose of clarity.

FIGURE 4 is a transverse section through the fruit feeding lanes taken along the line 4—4 of FIGURE 1 with the alternate positions of the lane dividers being shown in phantom lines.

FIGURE 5 is a perspective of one of the lane dividers shown in FIGURE 4.

FIGURE 6 is an isometric of the forward or lowermost ends of the lane dividers particularly illustrating the connecting structure which provides for their joint movement.

FIGURE 7 is a schematic diagram of the electrical circuitry for the fruit counting machine shown in FIGURE 1.

DESCRIPTION OF THE PREFERRED EMBODIMENT

The fruit counting machine 10, as shown in FIGURE 1, is arranged to receive fruit F from off of a horizontally extending belt conveyor 12 and to transport such fruit in single file fashion in three parallel lanes (FIG. 3) past pivotally mounted actuating arms 14 which are aligned with the lanes (one arm only being shown in FIG. 1). The fruit lanes are comprised of two separate conveyor sections—a downwardly extending feed conveyor section comprised of three parallel sets of V-belts 16; and an upwardly extending timing conveyor section comprised of three endless chain pusher conveyors 18, each of which are aligned end-to-end with one of the closely spaced set of belt conveyors. The lugs or pushers 19 on the fruit timing conveyors 18 are placed in a staggered relationship, as shown in FIGURE 3, so that fruit will be discharged from the machine at uniformly spaced time intervals. Consequently, by a timed activation of the switches engaged by each of the actuating arms 14, a count is attained for each fruit which is discharged from the machine.

As best shown in the plan view of FIGURE 3, the fruit F is directed into the counting machine 10 from the conveyor belt 12 by means of heavy wires or cables 22 which are laid over the top of the conveyor belt and at an angle to the flow of fruit so that the fruit is diverted (as shown by the arrows in FIG. 3) into each of the feeding lanes and to the conveyor belts 16. The wires 22 present only a minor obstruction to the fruit and a fruit may pass over a wire if the transversely extending fruit lane is filled or when the pressure of the fruit therebehind forces it forwardly. During operation of the counting machine, the conveyor belt 12 will normally be continuously driven. Typically, this belt will be a conventional conveyor bringing fruit at random from a sizing or grading apparatus upstream in the processing line.

The fruit counting machine 10 of the preferred embodiment of the present invention is seen to comprise a pair of side frame members 30 which are secured together at their forward ends by a back plate 32 having a downwardly extending ramp 33 extending inwardly from its upper edge to receive the fruit from the conveyor belt 12 and direct it to the V-belts 16. A gate 35 is vertically adjustably positioned adjacent to the inlet end of the machine to limit the height of the fruit passing over the ramp and particularly preventing piles of fruit more than one layer deep from entering the machine. This gate is seen to comprise a stop member 36 extending transversely of the counting machine above the inlet thereof and including a lower flat face 36a extending parallel to the ramp so that a single fruit of maximum width can pass therebetween. A pair of tubular stanchions 38 support the stop member at each side of the machine. The stanchions are adjustably mounted upon the side frame members 30 by means of quick release pins 40 (FIG. 3) which are placed in an aligned pair of holes 41 in opposing faces of the stanchions and an aligned pair of holes 42 (one only being shown in FIG. 1) in the side frame members 30 and in an offset flange 30a (FIG. 3) at the forward end edges of the machine. By removing the pins 40 and moving the stanchions upwardly or downwardly so that a new pair of holes 41 may be aligned with the holes 42 in the frame structure, the height of the stop member 36 is adjusted for the particular size of fruit being run so that only one layer of fruit can be passed into the machine.

Each of the V-belts 16 forming the feed conveyor section of the apparatus is mounted at its uppermost end about a grooved pulley 50 which is secured to a shaft 52 that is rotatably mounted at the sides of the machine to the side frame members 30. The lowermost ends of the V-belts are trained about grooved pulleys 54 which are rotatably mounted upon a drive shaft 56 that is also rotatably secured between the side frame members of the machine. During operation of the apparatus, the drive shaft 56 is arranged to be continuously driven by means of a motor M mounted upon a transversely extending bracket 60 at the upper end of the machine (FIG. 1), the motor serving to propel a drive chain 62 which is trained about a sprocket 64 affixed to the drive shaft. Each of the endless conveyors 18 has its lowermost end rotatably mounted by means of a sprocket 67 to the drive shaft 56 and its upper end rotatably mounted about a sprocket 68 which is secured to an idler shaft 69 that is rotatably attached to the side frame members of the machine. The drive shaft 56 also mounts a small drive sprocket 70 (FIG. 3) which is placed in driving engagement with the upper run of an endless drive chain 72 for providing driving power to the V-belts 16 through the upper shaft 52. As seen in FIG. 1, the lowermost end of drive chain 72 is not secured about the drive shaft 56 but is mounted upon idler sprockets 74 and 75 and driven through the drive sprocket 70 so that its upper run will be moved toward the fruit inlet when the drive shaft 56 is rotated in a counterclockwise direction (as viewed in FIG. 1) by the motor M. It will readily be seen that this counterclockwise driving rotation of the drive shaft 56 imparts a clockwise rotation to the timing conveyors 18 to move the fruit toward the discharge end of the machine and past the switch actuating arms 14. While the fruit on the feed conveyors 16 will gravitate downwardly toward the timing conveyors, the feed conveyors are actually driven in a direction opposite to the direction of the flow of the fruit and they cause the fruit to rotate with a counterclockwise motion (as shown by the arrows in FIGURE 1). This motion of the feed conveyors against the flow of the fruit aids in maintaining the fruit in a single file line in each of the lanes and prevents the fruit from piling up at the delivery point to the timing conveyors.

The timing conveyors 18 are seen to comprise endless chain conveyors which are provided with a plurality of spaced pushers or lugs 19 between which a single fruit is adapted to be received. The timing conveyors are separated by upright guide members 82 having arcuate side surfaces 84 which slope inwardly toward the conveyors. The guides are spaced apart so as to form a channel 86 therebetween (FIG. 3) of a sufficient width to allow passage of a conveyor and its attached fruit pusher members.

When each fruit is discharged from a timing conveyor 18, it will move the associated switch actuating arm 14 from the full line position to the phantom line position shown in FIGURE 1 and thereby actuate a switch LS–1, LS–2 or LS–3, one of which is mounted adjacent to each of the actuating arms (LS–3 only being shown in FIG. 1). The motor M also drives a timing shaft 90 in synchronism with the main drive shaft 56. The timing shaft has affixed thereto three timing cams 91, 92 and 93 (FIG. 2) having lobes 91a, 92a and 93a thereon, respectively, and the cams are positioned upon the timing shaft so that the lobes are equiangularly spaced thereabout (FIG. 1). A series of limit switches LS–1A, LS–2A and LS–3A are arranged to be successively actuated at uniformly timed intervals by the lobes on the timing cams as the timing shaft is continuously rotated. The limit switches LS–1, LS–2 and LS–3, activated by the actuating arms 14, and the limit switches LS–1A, LS–2A and LS–3A, activated by the timing cams, are arranged in a circuit such as is shown in FIGURE 7 whereby each of the fruit actuated switches is placed in series with one of the timing switches between the power lines L1 and L2. A counter C is placed in series with all of the switches. This counter may be any conventional electrically operated counting mechanism which is arranged to register a count for a received pulse and it may be a mechanism such as is shown in U.S. Patent 2,175,865 for example. As pointed out previously, the pushers 19 on the timing conveyors 18 are staggered so that fruit will be discharged from each lane at different times, and these conveyors are relatively positioned in direct correspondence to the relative positioning of their associated timing cams 91, 92 or 93. Consequently, when the switch LS–1 is actuated by a fruit being discharged from the machine, its associated timing switch LS–1A will be closed for a brief instant to allow a complete circuit to be closed through the counter C which therefore receives a short impulse signal. Limit switches LS–2 and LS–3, which are arranged adjacent to the other fruit lanes, pass impulses through their associated limit switches LS–2A and LS–3A in a similar manner. An impulse signal is therefore passed to the counter each time a fruit is discharged from one of the fruit carrying lanes.

A special feature of the present invention is the means provided to separate the fruit F upon the downwardly extending feed conveyors 16. Lane separators 100 are provided and are positioned in parallel relationship adjacent to each set of V-belt conveyors. Each of the lane separators comprises a longitudinally extending shaft 102 which is rotatably secured to an upstanding bracket 103 attached to the ramp 33 at the inlet end of the machine and to an upstanding flange 104 extending from a mounting frame 105 (FIG. 6) attached between the side frame members 30 at the base of the discharge end of the machine. Affixed to the upper end of the shaft 102 are diamond-shaped body portions 106 and 106a (FIG. 5) positioned about the mounting bracket 103. From the sectional view of FIGURE 4 it can be seen that the body portions of the lane separators have a greater width through the axis of the shaft 102 in one direction than they do in a direction normal thereto. Consequently, rotation of the shafts 102 through 90° will rotate the lane separators so that the spacing therebetween will either be increased or decreased depending upon the original orientation of the separators. It will be appreciated, therefore, that the size of the lanes can be changed by mere rotation of the shafts 102 through a one-quarter turn and that this will control the maximum size of fruit permitted to gravitate down the lanes. Since the counting machine must be adapted to handle both large fruit, such as grapefruit, and small fruit, such as the small oranges or tangerines, a change in lane size is necessary in order to prevent two of the smaller sized fruit from moving down a lane in parallel rather than in single file. When the line separators are moved into the phantom line position shown in FIGURE 4, the lane will be adapted to handle this smaller sized fruit and prevent more than a single line of fruit from forming between the lane separators; but should the counting machine be required to handle large fruit, the lane separators can be rotated and the lane widths opened up.

To further aid in keeping the fruit in single file between the lane separators 100, cylindrical support bars 110 are provided between each set of V-belts 16 so as to extend parallel to the V-belts and slightly below their upper runs therof. Each bar is mounted upon an upstanding support member 112 that is fastened at its lower edge to a supporting plate 114 extending between the side frame members 30 of the machine. It can readily be seen that the support bars 110 will provide a central supporting surface for the very small fruit which may otherwise tend to become wedged between the feed conveyor belts.

In order to rotate the lane separators 100 between their two operative positions, connecting arms 120 are welded onto the lowermost end of the central shafts 102. Each connecting arm is pivotally mounted to an upstanding flange 122 of a laterally extending connector bracket 124. The connector bracket is adapted to be swung laterally above the surface of an inwardly extending flange 126 of the mounting frame 105 when it is desired to rotate the separators. In order to slide the connector bracket between its two operative positions (as shown in full and phantom line in FIGURE 6) a Bowden cable 130 is attached at one end thereto. The Bowden cable extends about the periphery of the counting machine (as shown in FIGURE 3) and a handle 132 is provided at the exterior of the machine for ready access.

It can be seen that the apparatus of the present invention provides an improved counting machine structure which is readily adaptable for handling different sizes of fruit. The change in feed lane width can be made quickly and easily by the operator of the apparatus. It will also be appreciated that the structure permitting such change in lane size is not costly or complex so that it will unduly increase the cost of the apparatus to the fruit packers or processors. Also, the possibilities of misalignment and improper working such as found in some of the removable lane dividers used in the past are eliminated with the present invention.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a fruit counting machine comprising a first series of parallel conveyors arranged to direct fruit in single-file fashion in a generally downward direction from a fruit transport means extending at right angles thereto with the inlet ends of said first conveyors being at generally the same elevation as said fruit transport means, a second series of parallel conveyors arranged in end-to-end relationship with said first conveyors so as to receive the fruit therefrom, said second conveyors being directed in a generally upward direction, each of said second conveyors having a discharge point for said fruit at the uppermost end thereof, means on each of said second conveyors for causing the fruit to be picked off the adjacent one of said first conveyors and conveyed to the discharge point in uniformly spaced positions, and means at each of said discharge points for counting the fruit discharged therefrom, the improvement comprising lane separators positioned between each of said first conveyors to define lanes for said fruit, means for rotating said lane separators so as to change the effective width between adjacent separators and thereby change the effective width of the lanes whereby said machine may be adapted to handle fruit of large diameter at one time and fruit of a small diameter at another time and maintain each of said differently sized fruit in single-file arrangement in said lanes.

2. In a fruit counting machine according to claim 1 wherein each of said lane separators comprises an elongated member having a longitudinal axis and being generally diamond-shaped in cross section whereby said member is wider in a first plane through said axis than it is in a second plane through said axis normal to the first plane, a pivot shaft extending along the longitudinal axis of each of said members, and means for simultaneously pivoting said shafts through 90° to rotate said elongated members and thereby vary the spacings therebetween.

3. In a fruit counting machine according to claim 2 wherein each of said pivot shafts has an arm attached thereto extending radially therefrom, a lever member pivotally attached to each of said arms, and means for shifting the lateral position of said lever member to thereby rotate each of said pivot shafts when it is desired to change the spacing between said lane separators.

4. In a fruit counting machine according to claim 1 including a gate member extending transversely across said inlet ends of said first conveyors and being spaced thereabove, and means adjustably mounting said gate member to said machine to maintain it at an elevation above said first conveyors to permit the passage of but one layer of fruit to said machine from said fruit transport means.

5. In a fruit counting machine according to claim 1 wherein each of said first conveyors comprise an aligned pair of parallel endless belts and means for driving all of said endless belts such that the upper runs thereof are moved rearwardly in said machine toward said inlet ends and against the flow of the fruit thereon.

6. In a fruit counting machine according to claim 1 wherein each of said first conveyors comprise an aligned pair of parallel endless belts, and a rod extending midway between each of the belts of each of said pairs of belts in a direction generally parallel thereto and slightly below the upper runs thereof.

References Cited
UNITED STATES PATENTS
3,179,230  4/1965  Brown _____ 198—30

EDWARD A. SROKA, Primary Examiner

PO-1050
(5/69)

UNITED STATES PATENT OFFICE
CERTIFICATE OF CORRECTION

Patent No. 3,500,982          Dated September 7, 1971

Inventor(s) WILBER C. BELK

It is certified that error appears in the above-identified patent and that said Letters Patent are hereby corrected as shown below:

Column 2, line 29, change "paper" to --proper--.

Signed and sealed this 4th day of January 1972.

(SEAL)
Attest:

EDWARD M. FLETCHER, JR.          ROBERT GOTTSCHALK
Attesting Officer          Acting Commissioner of Patents